(12) United States Patent
Tadepalli et al.

(10) Patent No.: US 11,687,840 B2
(45) Date of Patent: Jun. 27, 2023

(54) FORECASTING WITH STATE TRANSITIONS AND CONFIDENCE FACTORS

(71) Applicant: Honeywell International Inc., Morris Plains, NJ (US)

(72) Inventors: Srikanth Tadepalli, Tempe, AZ (US);
Jay Shankar, Scottsdale, AZ (US);
Justin Dye, Chandler, AZ (US);
Abhishek Seth, Scottsdale, AZ (US)

(73) Assignee: Honeywell International Inc., Morris Plains, NJ (US)

( * ) Notice: Subject to any disclaimer, the term of this patent is extended or adjusted under 35 U.S.C. 154(b) by 363 days.

(21) Appl. No.: 16/877,923

(22) Filed: May 19, 2020

(65) Prior Publication Data

US 2020/0372302 A1 Nov. 26, 2020

Related U.S. Application Data

(60) Provisional application No. 62/850,184, filed on May 20, 2019.

(51) Int. Cl.
*G06N 20/20* (2019.01)
*G06F 18/21* (2023.01)
(Continued)

(52) U.S. Cl.
CPC ......... *G06N 20/20* (2019.01); *G06F 18/2163* (2023.01); *G06F 18/22* (2023.01);
(Continued)

(58) Field of Classification Search
CPC .. G06K 9/6261; G06K 9/6215; G06K 9/6277; G06K 9/628; G06K 9/6289;
(Continued)

(56) References Cited

U.S. PATENT DOCUMENTS 5,963,919 A 10/1999 Brinkley et al.
6,032,125 A 2/2000 Ando
(Continued)

FOREIGN PATENT DOCUMENTS

CN 104412283 B 8/2020
IN IN/PCT/2002/0013 2/2006
(Continued)

OTHER PUBLICATIONS

Paul, S. S., et al. "Application of object oriented image classification and Markov chain modeling for land use and land cover change analysis." Journal of Environmental Informatics 31.1 (2018): 30-40. (Year: 2018).*

(Continued)

*Primary Examiner* — Utpal D Shah
(74) *Attorney, Agent, or Firm* — Alston & Bird LLP

(57) ABSTRACT

Various embodiments described herein relate to techniques for forecasting with state transitions and confidence factors. In this regard, a system is configured to segment data associated with one or more assets to determine a set of classifications for one or more attributes related to the one or more assets. The system is also configured to generate a state machine associated with a Markov chain model based on the set of classifications for the data. Furthermore, the system is configured to perform a machine learning process associated with the state machine to determine one or more behavior changes associated with the one or more attributes related to the one or more assets. The system is also configured to predict, based on the one or more behavior changes associated with the one or more attributes related to the one or more assets, a change in demand data for the one or more assets during a future interval of time.

20 Claims, 8 Drawing Sheets

(51) Int. Cl.
  *G06F 18/22* (2023.01)
  *G06F 18/25* (2023.01)
  *G06F 18/2415* (2023.01)
  *G06F 18/2431* (2023.01)

(52) U.S. Cl.
  CPC ...... *G06F 18/2415* (2023.01); *G06F 18/2431* (2023.01); *G06F 18/251* (2023.01)

(58) Field of Classification Search
  CPC ........ G06N 20/20; G06N 3/047; G06F 18/22; G06F 18/2163; G06F 18/2415; G06F 18/2431; G06F 18/251; G06V 10/765; G06V 10/85
  See application file for complete search history.

(56) References Cited

U.S. PATENT DOCUMENTS

| | | | |
|---|---|---|---|
| 6,205,431 | B1 | 3/2001 | Willemain et al. |
| 6,516,301 | B1 | 2/2003 | Aykin |
| 6,611,726 | B1 | 8/2003 | Crosswhite |
| 6,751,574 | B2 | 6/2004 | Shinohara |
| 7,058,587 | B1 | 6/2006 | Horne |
| 7,080,026 | B2 | 7/2006 | Singh et al. |
| 7,266,518 | B2 | 9/2007 | Klim et al. |
| 7,313,534 | B2 | 12/2007 | Scheer |
| 7,584,116 | B2 | 9/2009 | Kakouros et al. |
| 8,103,560 | B2 | 1/2012 | Ohno et al. |
| 9,665,830 | B2 | 5/2017 | Cheng et al. |
| 10,685,283 | B2 * | 6/2020 | Li ................... G06F 16/285 |
| 10,748,421 | B2 * | 8/2020 | Zhong .............. G06Q 10/047 |
| 2003/0083963 | A1 | 5/2003 | Benson |
| 2007/0294146 | A1 | 12/2007 | Laksham et al. |
| 2009/0248488 | A1 | 12/2009 | Shah et al. |
| 2009/0327033 | A1 | 12/2009 | Rai et al. |
| 2010/0125487 | A1 | 5/2010 | Sinclair et al. |
| 2012/0303411 | A1 * | 11/2012 | Chen ............... G06Q 10/087 705/7.31 |
| 2013/0166350 | A1 * | 6/2013 | Willemain ....... G06Q 30/0202 705/7.31 |
| 2014/0039979 | A1 * | 2/2014 | Zhang ............. G06Q 30/0202 705/7.31 |
| 2016/0328734 | A1 * | 11/2016 | Lederman ....... G06Q 30/0223 |
| 2018/0247256 | A1 * | 8/2018 | Takigawa ............. G06N 20/00 |
| 2020/0210947 | A1 * | 7/2020 | Devarakonda ... G06Q 10/08355 |
| 2020/0211131 | A1 * | 7/2020 | Pangerl ............... G06Q 50/16 |

FOREIGN PATENT DOCUMENTS

| | | |
|---|---|---|
| IN | 1684/CHE/2008 | 7/2010 |
| IN | 201641002487 | 3/2016 |
| IN | 2659/MUM/2015 | 1/2017 |
| IN | 4197/MUM/2015 | 5/2017 |

OTHER PUBLICATIONS

Chen, Zhitang, Jiayao Wen, and Yanhui Geng. "Predicting future traffic using hidden Markov models." 2016 IEEE 24th international conference on network protocols (ICNP). IEEE, 2016. (Year: 2016).*

Datta et al., Forecasting and Risk Analysis in Supply Chain Management, [2008] [retrieved Jul. 7, 2020] retrieved from the Internet URL: https://dspace.mit.edU/bitstream/handle/1721.1/43948/garchproofofconcept_datta_granger_graham_sagar_doody_slone_hilmola_18december2008_final.pdf?sequence=1, 23 pages.

Deflem et al., A Discrete Time Markov Chain Model for a Periodic Inventory System With One-Way Substitution, [retrieved on Jul. 30, 2020], retrieved from the Internet URL: https://lirias.kuleuven.be/bitstream/123456789/308952/1/KBI_1111.pdf, 19 pages.

Fedriani, Framework for Spare Parts Management. Methods to Improve Decision Making., [2017] [retrieved Jul. 30, 2020], retrieved from the Internet URL: http://bibing.us.es/proyectos/abreproy/91212/fichero/TFG_Def_FJCFpdf.pdf, 137 pages.

Kocer, Forecasting Intermittent Demand by Markov Chain Model, 2012, retrieved on Jul. 30, 2020, retrieved from the Internet URL: http://www.ijicic.org/ijicic-12-06020.pdf, 12 pages.

Martin, Strategic Forecasting in the Supply Chain for Manufacturers, [2019] [retrieved Aug. 18, 2020] retrieved from the Internet URL: https://www.thebalance.com/forecasting-in-the-supply-chain-2221207, 3 pages.

Sigma Themal, 7 Things to Consider for Successful Ppare Parts Management [2017] [retrieved Aug. 17, 2020] retrieved from the Internet: https://www.sigmathermal.com/spare-parts-management/, 16 pages.

Vishnuvsve, Demand Forecasting in Supply Chain, [2016] [retrieved Aug. 18, 2020] retrieved from the Internet URL: https://www.slideshare.net/vishnuvsvn/demand-forecasting-in-supply-chain/5, 41 pages.

Vorhies, Predictive Analytics in the Supply Chain, [2015] [retrieved Aug. 17, 2020] retrieved from the Internet URL: https://www.datasciencecentral.com/profiles/blogs/predictive-analytics-in-the-supply-chain, 5 pages.

* cited by examiner

FORECASTING WITH STATE TRANSITIONS AND CONFIDENCE FACTORS

CROSS-REFERENCE TO RELATED APPLICATIONS

The present application claims priority to U.S. Provisional Application Ser. No. 62/850,184, titled "METHOD FOR SUPPLY CHAIN FORECASTING WITH STATE TRANSITIONS AND CONFIDENCE FACTORS," filed May 20, 2019, the contents of which are incorporated herein by reference in their entirety.

TECHNICAL FIELD

The present disclosure relates generally to machine learning, and more particularly to forecasting with state transitions and confidence factors.

BACKGROUND

With technological advancements related to data analytics, forecasting techniques are employed provide predictions for assets. Generally, forecasting techniques employ historical data related to the assets to provide the predictions for the assets. However, providing accurate predictions for assets based solely on historical data is generally difficult. Furthermore, providing accurate predictions for assets is generally challenging due to external factors related to the assets that affect outcome of the predictions.

BRIEF SUMMARY

In accordance with an embodiment of the present disclosure, a system comprises a processor and a memory. The memory stores executable instructions that, when executed by the processor, cause the processor to segment data associated with one or more assets to determine a set of classifications for one or more attributes related to the one or more assets. The executable instructions further cause the processor to generate a state machine associated with a Markov chain model based on the set of classifications for the data. Furthermore, the executable instructions cause the processor to perform a machine learning process associated with the state machine to determine one or more behavior changes associated with the one or more attributes related to the one or more assets. The executable instructions further cause the processor to predict, based on the one or more behavior changes associated with the one or more attributes related to the one or more assets, a change in demand data for the one or more assets during a future interval of time.

In accordance with another embodiment of the present disclosure, a computer-implemented method is provided. The computer-implemented method provides for segmenting, by a device comprising a processor, data associated with one or more assets to determine a set of classifications for one or more attributes related to the one or more assets. The computer-implemented method also provides for generating, by the device, a state machine associated with a Markov chain model based on the set of classifications for the data. Furthermore, the computer-implemented method provides for performing, by the device, a machine learning process associated with the state machine to determine one or more behavior changes associated with the one or more attributes related to the one or more assets. The computer-implemented method also provides for predicting, by the device and based on the one or more behavior changes associated with the one or more attributes related to the one or more assets, a change in demand data for the one or more assets during a future interval of time.

In accordance with yet another embodiment of the present disclosure, a computer program product is provided. The computer program product comprises at least one computer-readable storage medium having program instructions embodied thereon, the program instructions executable by a processor to cause the processor to segment data associated with one or more assets to determine a set of classifications for one or more attributes related to the one or more assets. The program instructions are also executable by the processor to cause the processor to generate a state machine associated with a Markov chain model based on the set of classifications for the data. Furthermore, the program instructions are executable by the processor to cause the processor to perform a machine learning process associated with the state machine to determine one or more behavior changes associated with the one or more attributes related to the one or more assets. The program instructions are also executable by the processor to cause the processor to predict, based on the one or more behavior changes associated with the one or more attributes related to the one or more assets, a change in demand data for the one or more assets during a future interval of time.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1:
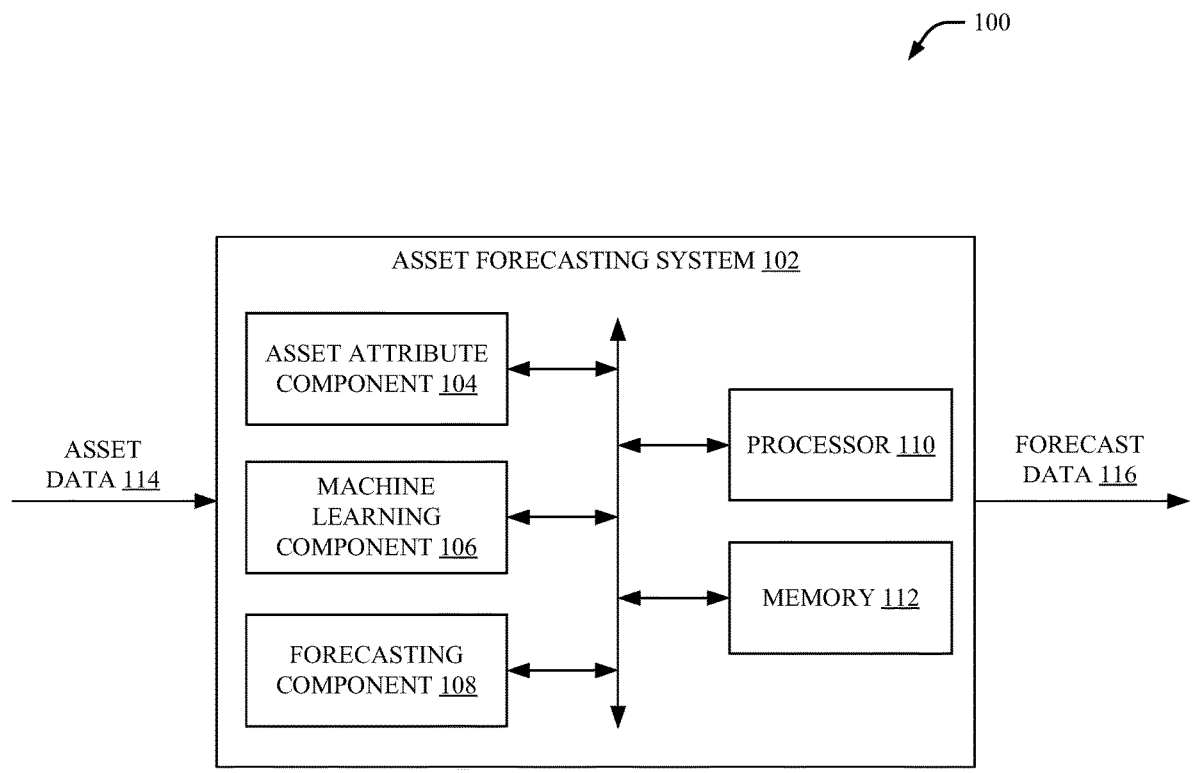
FIG. 1 illustrates an asset forecasting system, in accordance with one or more embodiments described herein.

Various embodiments of the present invention now will be described more fully hereinafter with reference to the accompanying drawings, in which some, but not all embodiments of the invention are shown. Indeed, the invention may be embodied in many different forms and should not be construed as limited to the embodiments set forth herein. Rather, these embodiments are provided so that this disclosure will satisfy applicable legal requirements. The term "or" is used herein in both the alternative and conjunctive sense, unless otherwise indicated. The terms "illustrative," "example," and "exemplary" are used to be examples with no indication of quality level. Like numbers refer to like elements throughout.

The phrases "in an embodiment," "in one embodiment," "according to one embodiment," and the like generally mean that the particular feature, structure, or characteristic following the phrase may be included in at least one embodiment of the present disclosure, and may be included in more than one embodiment of the present disclosure (importantly, such phrases do not necessarily refer to the same embodiment).

The word "exemplary" is used herein to mean "serving as an example, instance, or illustration." Any implementation described herein as "exemplary" is not necessarily to be construed as preferred or advantageous over other implementations.

If the specification states a component or feature "can," "may," "could," "should," "would," "preferably," "possibly," "typically," "optionally," "for example," "often," or "might" (or other such language) be included or have a characteristic, that particular component or feature is not required to be included or to have the characteristic. Such component or feature may be optionally included in some embodiments, or it may be excluded.

Supply chain management of assets strives to provide continuous and seamless availability of resources for assets (e.g., replacement parts, asset demand, etc.) to maximize performance of assets and/or to optimize assets. However, factors endogenous and exogenous to assets may affect availability of resources for assets, and may result in decreased performance, decreased efficiency and/or increased expenses for assets. As such, forecasting techniques for supply chain management of assets are often employed to improve performance and/or optimize availability of assets. Forecasting techniques generally provide predictions for assets. Generally, forecasting techniques employ historical data related to the assets to provide the predictions for the assets. In certain scenarios, forecasting techniques are employed to predict demand for assets in anticipation of market volatility related to assets, understocking situations related to assets and/or to address upsides in demand for assets. In order to minimize disruption in a supply chain for assets, vendor metrics are often employed. Vendor metrics are often associated with service level agreements related to supply parameters (e.g., stocking levels, fill rates, etc.). Therefore, in certain implementations, a hedging technique may be employed to project cycle stock by inflating estimates to include a safety margin. However, hedging techniques may result in unused resources and/or increased inventory costs for assets. As such, a fine balance exists between cost of managing inventory levels for assets and maintaining expected service levels for assets. Moreover, both volume and timing of demand for assets is generally highly variable, and thus ordering related to assets and/or consumption patterns for assets are generally difficult to predict. Additionally, demand related to assets generally become increasingly difficult to predict as a future period of time for prediction increases.

Thus, to address these and/or other issues, forecasting with state transitions and confidence factors is disclosed herein. In an aspect, the forecasting disclosed herein employs one or more time-series models to provide improved forecasting for assets. In another aspect, the one or more time-series models are aggregated and/or optimized to provide improved forecasting for assets. One or more time-dependent state definitions are additionally employed, in certain embodiments, to model behavior of the assets across time. In an embodiment, one or more forecasting models are employed to estimate data for one or more attributes related to one or more assets. For example, in an embodiment, one or more forecasting models are employed to estimate order quantities related to one or more assets for a current time period. Furthermore, in certain embodiments, each forecast model is biased to a most recent time period, a cyclical nature of the supply chain, and/or a state compatibility with an interval of time (e.g., a current year). In certain embodiments, an optimized ensemble forecasting model provides improved accuracy of data for one or more attributes related to one or more assets. For example, an optimized ensemble forecasting model provides improved accuracy for both cycle stock forecast of the one or more assets and safety stock predictions for the one or more assets, resulting in an overall reduction in capital costs for the one or more assets. In an exemplary embodiment, a forecasting supply chain model is provided by forecasting with state transitions and confidence factors.

In another embodiment, the forecasting disclosed herein combines inventory health metrics of one or more assets with cost modeling for the one or more assets to produce time-specific forecast estimates for the one or more assets. As such, improved accuracy of forecasting results is provided. In an aspect, a time-dependent, three-dimensional state representation to define assets based on internal and external factors is provided. A state of assets is also tracked across different intervals of time, in certain embodiments, to predict a most probable future state for an asset. In certain embodiments, forecasts across different intervals of time are ensembled into an ensemble forecast model using optimized confidence factors and/or automated prediction-correction for increased forecasting accuracy. In certain embodiments, accuracy of a forecast model is determined based on a Mean Absolute Prediction Error (MAPE) technique. In yet another embodiment, each asset is assigned a signature based on a set of categories that define a current position and/or forecasted future behavior of the respective asset. For instance, in an embodiment, a category for an asset is determined based on Fast, Slow, and Non-Moving (FSN) analysis, High, Medium, and Low (HML) analysis, Scarce, Difficult, and Easy (SDE) analysis, and/or another type of analysis. The FSN analysis performs classification, for example, based on movement (e.g., velocity) of assets, quantity of assets, and/or ordering times of assets. The HML analysis performs classification, for example, based on price of assets. The SDE analysis performs classification, for example, based on availability of assets with lead time corresponding to an access parameter. Accordingly, in one or more embodiments, the forecasting disclosed herein provides a dynamic assessment of data related to assets. Forecasting disclosed herein ca also provide asset specificity for forecasts. Furthermore, in one or more, the forecasting disclosed herein provides more accurate safety stock levels and/or more accurate determination of ordering/consumption context. As such, an improved forecasting system with improved performance, improved efficiency, and/or improved accuracy of predictions is provided. Moreover, performance and/or quality of an asset being analyzed by the forecasting system is also improved.

FIG. 1 illustrates a system 100 that provides an exemplary environment in accordance with one or more embodiments of the disclosure. According to an embodiment, the system 100 includes an asset forecasting system 102 to facilitate a practical application of forecasting related to one or more assets. In an embodiment, the asset forecasting system 102 is a processor device that provides forecasting and/or one or more predictions for one or more assets based on one or more state transitions and/or one or more confidence factors for data related to the one or more assets. In certain embodiments, the asset forecasting system 102 provides the forecasting and/or the one or more predictions by employing machine learning to determine one or more behavior changes associated with one or more attributes related to the one or more assets. The asset forecasting system 102 is related to one or more technologies to facilitate forecasting and/or one or more predictions for one or more assets. Moreover, the asset forecasting system 102 provides an improvement to one or more technologies such as data analytics technologies, forecasting technologies, supply chain forecasting technologies, supply chain management technologies, demand planning technologies, asset technologies, machine learning technologies, artificial intelligence technologies, digital technologies, network technologies, server technologies, cloud-computing technologies, connected enterprise technologies, industrial technologies, manufacturing technologies, aerospace technologies, transportation technologies, and/or one or more other technologies. In an implementation, the asset forecasting system 102 improves performance of an asset. For example, in one or more embodiments, the asset forecasting system 102 provides improved performance and/or improved quality for an asset.

The asset forecasting system 102 includes an asset attribute component 104, a machine learning component 106 and/or a forecasting component 108. Additionally, in certain embodiments, the asset forecasting system 102 includes a processor 110 and/or a memory 112. In certain embodiments, one or more aspects of the asset forecasting system 102 (and/or other systems, apparatuses and/or processes disclosed herein) constitute executable instructions embodied within a computer-readable storage medium (e.g., the memory 112). For instance, in an embodiment, the memory 112 stores computer executable component and/or executable instructions (e.g., program instructions). Furthermore, the processor 110 facilitates execution of the computer executable components and/or the executable instructions (e.g., the program instructions). In an example embodiment, the processor 110 is configured to execute instructions stored in the memory 112 or otherwise accessible to the processor 110.

In an embodiment, the processor 110 is a hardware entity (e.g., physically embodied in circuitry) capable of performing operations according to one or more embodiments of the disclosure. Alternatively, in an embodiment where the processor 110 is embodied as an executor of software instructions, the software instructions configure the processor 110 to perform one or more algorithms and/or operations described herein in response to the software instructions being executed. In an embodiment, the processor 110 is a single core processor, a multi-core processor, multiple processors internal to the asset forecasting system 102, a remote processor (e.g., a processor implemented on a server), and/or a virtual machine. In certain embodiments, the processor 110 be in communication with the memory 112, the asset attribute component 104, the machine learning component 106 and/or the forecasting component 108 via a bus to, for example, facilitate transmission of data among the processor 110, the memory 112, the asset attribute component 104, the machine learning component 106 and/or the forecasting component 108. The processor 110 may be embodied in a number of different ways and, in certain embodiments, includes one or more processing devices configured to perform independently. Additionally or alternatively, the processor 110 includes one or more processors configured in tandem via a bus to enable independent execution of instructions, pipelining of data, and/or multi-thread execution of instructions. In an embodiment, the memory 112 is non-transitory and includes, for example, one or more volatile memories and/or one or more non-volatile memories. In other words, in certain embodiments, the memory 112 is an electronic storage device (e.g., a computer-readable storage medium). The memory 112 is configured to store information, data, content, one or more applications, one or more instructions, or the like, to enable the asset forecasting system 102 to carry out various functions in accordance with one or more embodiments disclosed herein. As used herein in this disclosure, the term "component," "system," and the like, is and/or includes a computer-related entity. For instance, "a component," "a system," and the like disclosed herein is either hardware, software, or a combination of hardware and software. As an example, a component is, but is not limited to, a process executed on a processor, a processor, circuitry, an executable component, a thread of instructions, a program, and/or a computer entity.

In an embodiment, the asset forecasting system 102 (e.g., the asset attribute component 104 of the asset forecasting system 102) receives asset data 114. The asset data 114 is data related to one or more assets. The asset data 114 includes digital data and/or analog data related to the one or more assets. Furthermore, the asset data 114 describes one or more attributes for the one or more assets. For example, the asset data 114 can include records data, part number data, price data, sales data, quantity data, order quantity data, safety stock data, state data, sales price data, historical price change data, demand data, lead time data, location data, customer data, seasonality data, sensor data, voltage level data, current level data, temperature data, and/or other data related to the one or more assets. The one or more assets are one or more mechanical components, one or more electrical components, one or more parts, one or more machines, one or more equipment, one or more tools, one or more instruments, one or more sensors, and/or one or more other types of assets.

In an embodiment, the asset attribute component 104 obtains the asset data 114 from one or more databases that store data related to the one or more assets. Additionally or alternatively, the asset attribute component 104 obtains the data from one or more components of the one or more assets. In certain embodiments, the asset attribute component 104 obtains the asset data 114 by monitoring the one or more assets and/or the one or more databases. In certain embodiments, the asset attribute component 104 transforms formatting of one or more portions of the asset data 114 to facilitate data analytics with respect to the asset data 114. Additionally or alternatively, in certain embodiments, the asset attribute component 104 filters one or more portions of the asset data 114 to facilitate data analytics with respect to the asset data 114.

In another embodiment, the asset attribute component 104 performs data analytics with respect to the asset data 114 to derive understanding with respect to the asset data 114. For instance, in an embodiment, the asset attribute component 104 performs a descriptive analytics process to parse and/or segment the asset data 114. Based on the parsing and/or segmenting of the asset data 114, the asset attribute component 104 determines one or more attributes included in the asset data 114. For example, based on the parsing and/or segmenting of the asset data 114, the asset attribute component 104 determines one or more classifications for one or more attributes related to the one or more assets.

In certain embodiments, the asset attribute component 104 segments and/or classifies the asset data 114 based on a three-axis segmentation system where each asset is tagged to a certain condition within a respective axis. The three-axis segmentation system includes, for example, a first axis associated with a first attribute, a second axis associated with a second attribute, and a third axis associated with a second attribute. In one example, the three-axis segmentation system is a first axis associated with demand, a second axis associated with price, and a third axis associated with availability. In certain embodiments, a classification for a portion of the asset data 114 corresponds to an electrical domain, a mechanical domain, or a component domain. An electrical domain for the one or more assets is, for example, a classification for electrical assets. A mechanical domain for the one or more assets is, for example, a classification for mechanical assets. A component domain for the one or more assets is, for example, a classification for component assets (e.g., electrical components and/or mechanical components from the one or more assets). In an aspect, the asset attribute component 104 determines one or more classifications for one or more attributes related to an electrical domain for the one or more assets. For example, in certain embodiments, the asset attribute component 104 determines a number of parts related to an electrical domain for the one or more assets, a number of records related to an electrical domain for the one or more assets, a number of demand streams related to an electrical domain for the one or more assets, a lead time related to an electrical domain for the one or more assets, safety stock related to an electrical domain for the one or more assets, price related to an electrical domain for the one or more assets, an average price related to an electrical domain for the one or more assets, an order quantity related to an electrical domain for the one or more assets, a price factor related to an electrical domain for the one or more assets, and/or another attribute related to an electrical domain for the one or more assets.

Additionally or alternatively, the asset attribute component 104 determines one or more classifications for one or more attributes related to a mechanical domain for the one or more assets. For example, in certain embodiments, the asset attribute component 104 determines a number of parts related to a mechanical domain for the one or more assets, a number of records related to a mechanical domain for the one or more assets, a number of demand streams related to a mechanical domain for the one or more assets, a lead time related to a mechanical domain for the one or more assets, safety stock related to a mechanical domain for the one or more assets, price related to a mechanical domain for the one or more assets, an average price related to a mechanical domain for the one or more assets, an order quantity related to a mechanical domain for the one or more assets, a price factor related to a mechanical domain for the one or more assets, and/or another attribute related to a mechanical domain for the one or more assets. Additionally or alternatively, in certain embodiments, the asset attribute component 104 determines one or more classifications for one or more attributes related to a component domain for the one or more assets. For example, in certain embodiments, the asset attribute component 104 determines a number of parts related to a component domain for the one or more assets, a number of records related to a component domain for the one or more assets, a number of demand streams related to a component domain for the one or more assets, a lead time related to a component domain for the one or more assets, safety stock related to a component domain for the one or more assets, price related to a component domain for the one or more assets, an average price related to a component domain for the one or more assets, an order quantity related to a component domain for the one or more assets, a price factor related to a component domain for the one or more assets, and/or another attribute related to a component domain for the one or more assets.

In yet another embodiment, the asset attribute component 104 generates a state machine based on the one or more classifications for the asset data 114. For example, in certain embodiments, the asset attribute component 104 generates a state machine that includes a set of states that correspond to respective classifications for respective portions of the asset data 114. In an aspect, the asset attribute component 104 correlates respective states of the state machine to respective classifications from the set of classifications. In certain embodiments, a state of the state machine is associated with multiple classifications for the asset data 114. For instance, in certain embodiments, the asset attribute component 104 configures a state of the state machine with two or more classifications. In a non-limiting embodiment, the asset attribute component 104 configures a state of the state machine with a first classification related to demand for the one or more assets, a second classification related to price for the one or more assets, and a third classification related to availability for the one or more assets. In one example, a state of the state machine is associated with a certain price for an asset at a certain season of time (e.g., a certain month, etc.).

In an embodiment, the asset attribute component 104 generates a state machine associated with a Markov chain model based on the one or more classifications for the asset data 114. In an aspect, the asset attribute component 104 defines the states and/or state transitions in the Markov chain model based on the one or more classifications for the asset data 114. The Markov chain model is, for example, a stochastic model that includes a sequence of states that is traversed based on a probability determined from one or more previous states in the Markov chain model. For example, in certain embodiments, a probability distribution associated with the one or more classifications is employed to traverse states of the Markov chain model. In another aspect, the Markov chain model portrays transient behavior associated with the asset data 114. A state of the state machine (e.g., a state of the Markov chain model) is a three-dimensional representation of an asset where each dimension is derived from one or more classification categories in each axis. For instance, an axis is represented by an attribute for an asset. Furthermore, a classification category for the attribute is determined. In one example, the one or more classification categories includes demand, price, and/or availability. In another aspect, a state is considered true for a particular time period. For example, (St, L, MLT) is a state that may signify that a particular asset has had stagnant demand (St), is low priced (L), and has medium lead time (MLT). In a non-limiting example, the state machine includes forty-five states representing forty-five permutations of classifications from the 3-axis part segmentation system.

The machine learning component 108 performs a machine learning process associated with the state machine to determine one or more behavior changes associated with the one or more attributes related to the one or more assets. For example, based on understanding of the asset data 114 provided by the machine learning process, the machine learning component 108 determines one or more behavior changes associated with the one or more attributes related to the asset data 114. In an aspect, the one or more behavior changes correspond to one or more inflection points in the asset data 114. For example, in certain embodiments, the one or more behavior changes correspond to one or more patterns of change in the asset data. In another aspect, the one or more behavior changes correspond to state changes within the state machine. For example, in certain embodiments, the machine learning component 108 determines the one or more behavior changes based on one or more state transitions of the state machine. In certain embodiments, the machine learning process employs principles of iteration, self-adjustment, and/or self-learning associated with principles of machine learning and/or artificial intelligence. In an aspect, the machine learning component 108 employs the state machine to determine one or more behavior changes associated with one or more classifications for one or more portions of the asset data 114, one or more correlations for one or more portions of the asset data 114, one or more inferences for one or more portions of the asset data 114, one or more patterns for one or more portions of the asset data 114, and/or other information related to one or more portions of the asset data 114. In certain embodiments, the machine learning component 108 employs a traversal through different states of the Markov chain model to determine one or more behavior changes associated with the one or more attributes related to the asset data 114. In one example, the machine learning component 108 identifies a behavior change associated with a demand spike in the asset data 114. In another example, the machine learning component 108 identifies a behavior change associated with an increase in a number of parts associated with the asset data 114 with an increase during a particular season. In an aspect, the machine learning component 108 predicts a most likely state of the state machine for an asset based on the machine learning process. For example, in certain embodiments, the machine learning component 108 employs probabilities and/or transitions associated with a traversal through the state machine to predict a most likely state of the state machine for an asset. In an embodiment, the machine learning component 108 employs a random walk traversal technique through the Markov chain model to predict a most likely state of the state machine for an asset. In another embodiment, the machine learning component 108 employs a neural network to simulate traversal through the Markov chain model.

The forecasting component 108 provides forecasting associated with the asset data 114 based on the one or more behavior changes associated with the one or more attributes related to the one or more assets. For instance, in an embodiment, the forecasting component 108 generates forecast data 116 related to the forecasting associated with the asset data 114. In an aspect, the forecasting component 108 predicts, based on the one or more behavior changes associated with the one or more attributes related to the one or more assets, a change in data for the one or more assets during a future interval of time. For example, in an embodiment, the forecasting component 108 predicts, based on the one or more behavior changes associated with the one or more attributes related to the one or more assets, a change in demand data for the one or more assets during a future interval of time. In one embodiment, the forecasting component 108 predicts a state from the state machine for an asset during the future interval of time based on the one or more behavior changes associated with the one or more attributes related to the one or more assets. In another embodiment, the forecast data 116 includes a forecasting model that provides the forecasting associated with the asset data 114. For instance, the forecast model predicts the change in demand data for the one or more assets during a future interval of time. In certain embodiments, the forecast model predicts a state of an asset during the future interval of time based on the one or more behavior changes associated with the one or more attributes related to the one or more assets. For example, in certain embodiments, the forecast model predicts a certain state from the set of state of the state machine for an asset during the future interval of time based on the one or more behavior changes associated with the one or more attributes related to the one or more assets.

In certain embodiments, the forecasting component 108 generates an ensembled forecast that combines two or more forecasts for the asset data 114. For instance, in an embodiment, the ensembled forecast is an ensembled model that comprises a combination of at least a first forecast model related to a first prediction for the change in the demand data, and a second forecast model related to a second prediction for the change in the demand data. In an aspect, to facilitate generation of the ensembled forecast, the forecasting component 108 employs an exponential smoothing technique to generate the forecast data 116. For example, the forecasting component 108 performs an exponential smoothing process that smooths time series data of respective forecasts of the ensembled forecast. In an embodiment, the forecasting component 108 smooths the time series data by applying a set of weights with exponentially decreasing weight values to the time series data. Additionally or alternatively, in certain embodiments, the forecasting component 108 employs one or more confidence factors to generate the forecast data 116. For example, in certain embodiments, the forecasting component 108 applies a confidence factor to one or more forecasts associated with the ensembled forecast. A value of a confidence factor is determined, for example, based on similarity of states between different forecasts associated with the ensembled forecast. For instance, in an embodiment, the forecasting component 108 applies a first confidence factor to a first forecast and a second confidence factor to a second forecast based on similarity of states of the first forecast and the second forecast. In another embodiment, the forecasting component 108 evaluates accuracy of the forecast data 116. For example, in an embodiment, the forecasting component 108 evaluates accuracy of the forecast data 116 based on a MAPE technique. In an aspect, the forecasting component 108 determines whether one or more parameters and/or one or more values of the forecast data 116 satisfies a defined MAPE threshold value. In response to a determination that the forecast data 116 satisfies the defined MAPE threshold value, the forecasting component 108 updates one or more portions of the forecast data 116. In certain embodiments, in response to a determination that the forecast data 116 satisfies the defined MAPE threshold value, the forecasting component 108 selects a different forecast for the asset data 114. In certain embodiments, the forecasting component 108 formats the forecast data 116 as visual intelligence data that is rendered via an electronic interface of a computing device. For example, in an embodiment, the visual intelligence data includes one or more graphical elements related to the forecast data 116. In certain embodiments, the forecasting component 108 configures arrangement and/or display of the visual intelligence data related to the forecast data 116 for optimal viewing and/or analysis of the forecast data 116.

Figure 2:
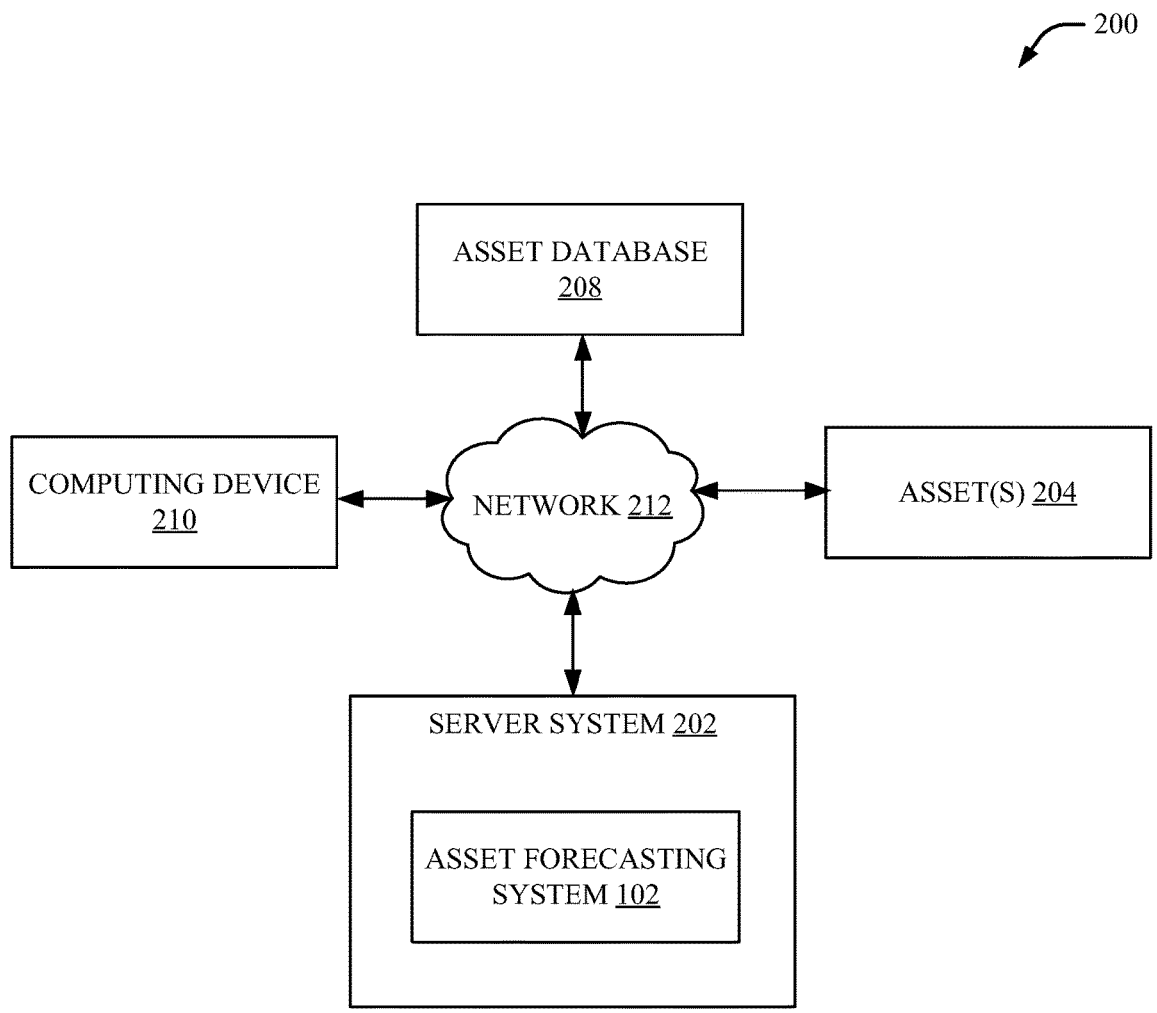
FIG. 2 illustrates system associated with an exemplary environment that facilitates forecasting related to one or more assets, in accordance with one or more embodiments described herein.

FIG. 2 illustrates a system 200 that provides an exemplary environment in accordance with one or more embodiments of the disclosure. The system 200 includes a server system 202, one or more assets 204, an asset database 208 and/or a computing device 210. In an embodiment, the server system 202, the one or more assets 204, the asset database 208 and/or the computing device 210 are in communication via a network 212. The server system 202 includes the asset forecasting system 102 that includes the asset attribute component 104, the machine learning component 106, the forecasting component 108, the processor 110 and/or the memory 112. The one or more assets 204 includes one or more mechanical components, one or more electrical components, one or more parts, one or more machines, one or more equipment, one or more tools, one or more instruments, one or more sensors, and/or one or more other types of assets. The asset database 208 stores and/or manages the asset data 114 associated with the one or more assets 204.

In an embodiment, the asset forecasting system 102 of the server system 202 receives and/or accesses the asset data 114 via the asset database 208. Furthermore, the asset forecasting system 102 of the server system 202 segments the asset data 114 stored in the asset database 208, performs a machine learning process associated with a state machine to determine one or more behavior changes associated with the asset data 114, generates the forecast data 116 based on the one or more behavior changes associated with the asset data 114, etc., as more fully disclosed herein. In certain embodiments, the asset forecasting system 102 obtains the asset data 114 from the asset database 208. Furthermore, the asset forecasting system 102 determines a segmentation of attributes of the asset data 114 based on the asset data 114. In an embodiment, the asset forecasting system 102 also defines states and state transitions related to the attributes of the asset data 114. In an aspect, the asset forecasting system 102 also performs a piece-wise forecast with respect to the attributes. In certain embodiments, the asset forecasting system 102 evaluates confidence factors for the piece-wise forecast. Additionally, the asset forecasting system 102 evaluates accuracy, days of sale inventory, and/or safety stock related to the piece-wise forecast. The asset forecasting system 102 then performs a forecast related to the one or more assets 204 for a future interval of time. The forecast related to the one or more assets 204 is included in the forecast data 116, for example. In certain embodiments, the asset forecasting system 102 of the server system 202 provides the forecast data 116 to the computing device 210. For example, in an embodiment, the asset forecasting system 102 of the server system 202 transmits the forecast data 116 to the computing device via the network 212 to facilitate rendering of at least a portion of the forecast data 116 via an electronic interface (e.g., a graphical user interface) of the computing device 210. The computing device 210 is a mobile device, a computer device, a smartphone, a tablet computer, a monitor, a wearable device, a virtual reality device, and/or another type of computing device associated with a display.

Figure 3:
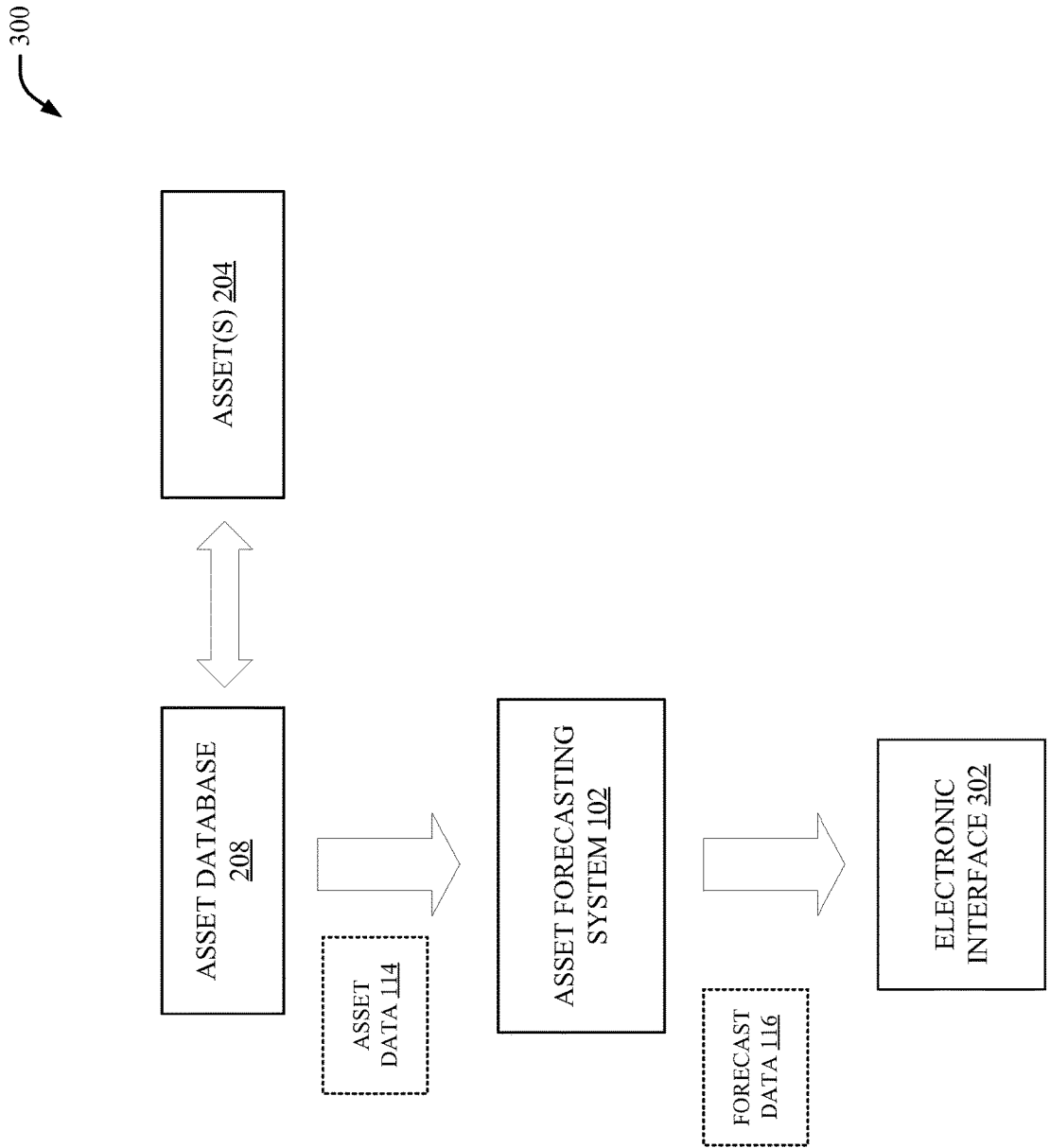
FIG. 3 illustrates system that facilitates forecasting related to one or more assets, in accordance with one or more embodiments described herein.

FIG. 3 illustrates a system 300 associated with the exemplary environment shown in FIG. 2, in accordance with one or more embodiments of the disclosure. As illustrated in FIG. 3, the one or more assets are communicatively coupled to the asset database to facilitate storage of the asset data 114. Furthermore, the asset data 114 is provided to the asset forecast system 102 to facilitate forecasting associated with the one or more assets 204. Furthermore, the asset forecasting system 102 generates the forecast data 116 to facilitate rendering of at least a portion of the forecast data 116 via an electronic interface 302. The electronic interface 302 is an electronic interface of the computing device 210. In certain embodiments, the electronic interface 302 displays one or more graphical elements associated with the forecast data 116. In an aspect, the electronic interface 302 provides a graphical user interface that displays one or more actionable recommendations associated with the forecast data 116. In another aspect, the electronic interface 302 provides a graphical user interface to facilitate managing data use associated with the one or more assets 204, costs associated with the one or more assets 204, asset planning associated with the one or more assets 204, asset services associated with the one or more assets 204, asset operations associated with the one or more assets 204, and/or one or more other aspects of the one or more assets 204.

Figure 4:
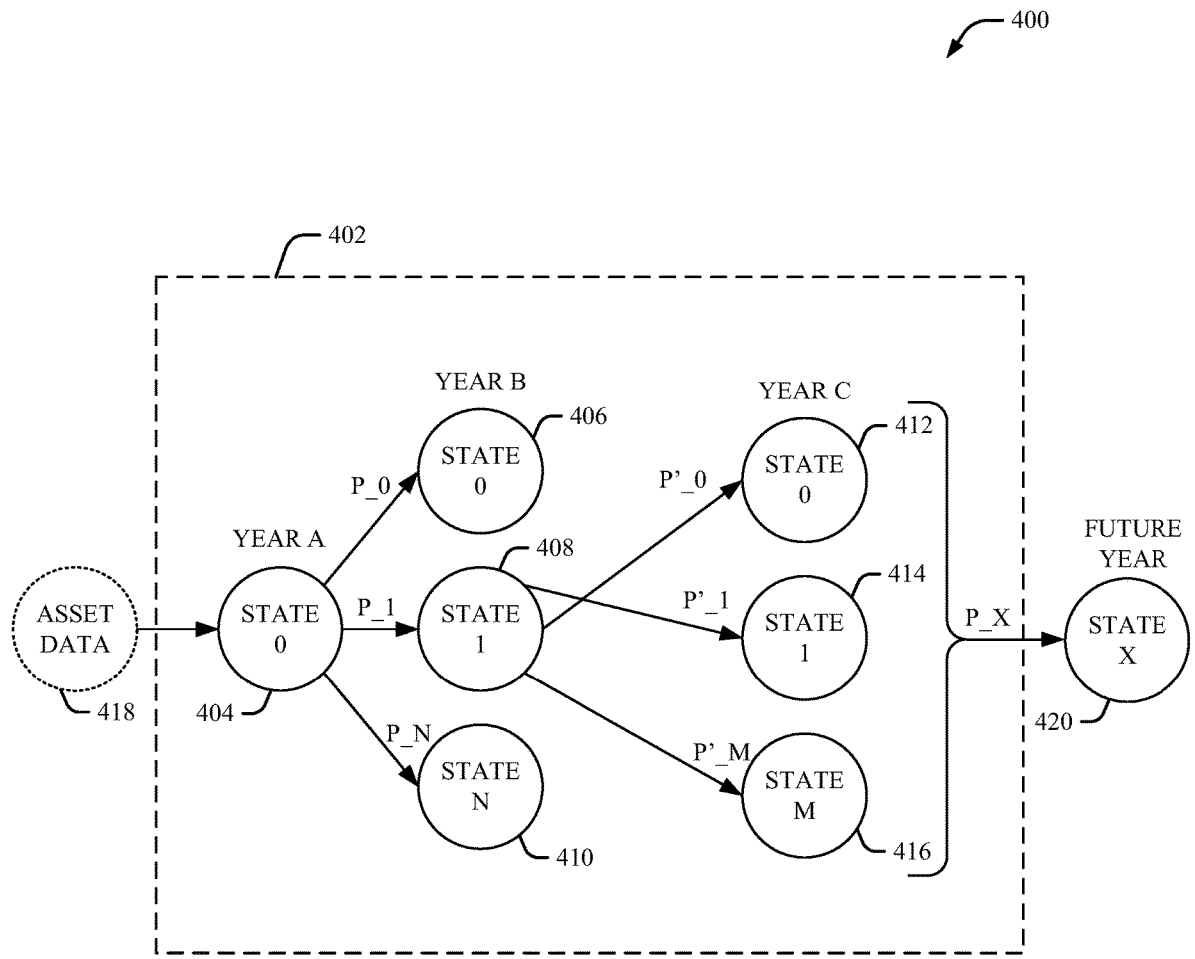
FIG. 4 illustrates a state machine, in accordance with one or more embodiments described herein.

FIG. 4 illustrates a system 400 in accordance with one or more embodiments of the disclosure. The system 400 includes a state machine 402. In an embodiment, the state machine 402 is a Markov chain model. In an embodiment illustrated in FIG. 4, the state machine 402 includes a state 404, a state 406, a state 408, a state 410, a state 412, a state 414 and a state 416. The state 404 is a first state (e.g., STATE 0) for a classification during a first time period (e.g., YEAR A). The state 406 is a first state (e.g., STATE 0) for a first classification during a second time period (e.g., YEAR B), the state 408 is a second state (e.g., STATE 1) for a second classification during the second time period (e.g., YEAR B), and state 410 is an Nth state (e.g., STATE N) for an Nth classification during the second time period (e.g., YEAR B), where N is an integer. The state 412 is a first state (e.g., STATE 0) for a first classification during a third time period (e.g., YEAR C), the state 414 is a second state (e.g., STATE 1) for a second classification during the third time period (e.g., YEAR C), and the state 416 is an Mth state (e.g., STATE M) for an Mth classification during the third time period (e.g., YEAR C), where M is an integer. In an example embodiment, a probability $P\_0$ represents a probability that the state 404 transitions to the state 406, a probability $P\_1$ represents a probability that the state 404 transitions to the state 408, and a probability $P\_N$ represents a probability that the state 404 transitions to the state 410. Furthermore, a probability $P'\_0$ represents a probability that the state 408 transitions to the state 412, a probability $P'\_1$ represents a probability that the state 408 transitions to the state 414, and a probability $P'\_M$ represents a probability that the state 408 transitions to the state 416.

In an embodiment, asset data 418 is employed to traverse the state machine 402 to determine a predicted state 420 (e.g., STATE X) during a future time period (e.g., FUTURE YEAR). For instance, in an embodiment, the state machine 402 is employed to predict a most likely state (e.g., STATE X) of an asset in a future year based on traversal through the states of the state machine 402 in previous years (e.g., YEAR A, YEAR B and YEAR C). In an aspect, intermediate probabilities and/or transitions between states are employed to estimate the most likely state (e.g., STATE X) using a highest probability value (e.g., probability $P\_X$). In one example, the asset data 418 includes an asset identification and sales data for the asset. In another example, the predicted state 420 predicts a change in data for the asset associated with the asset data 418 during the future time period (e.g., FUTURE YEAR).

Figure 5:
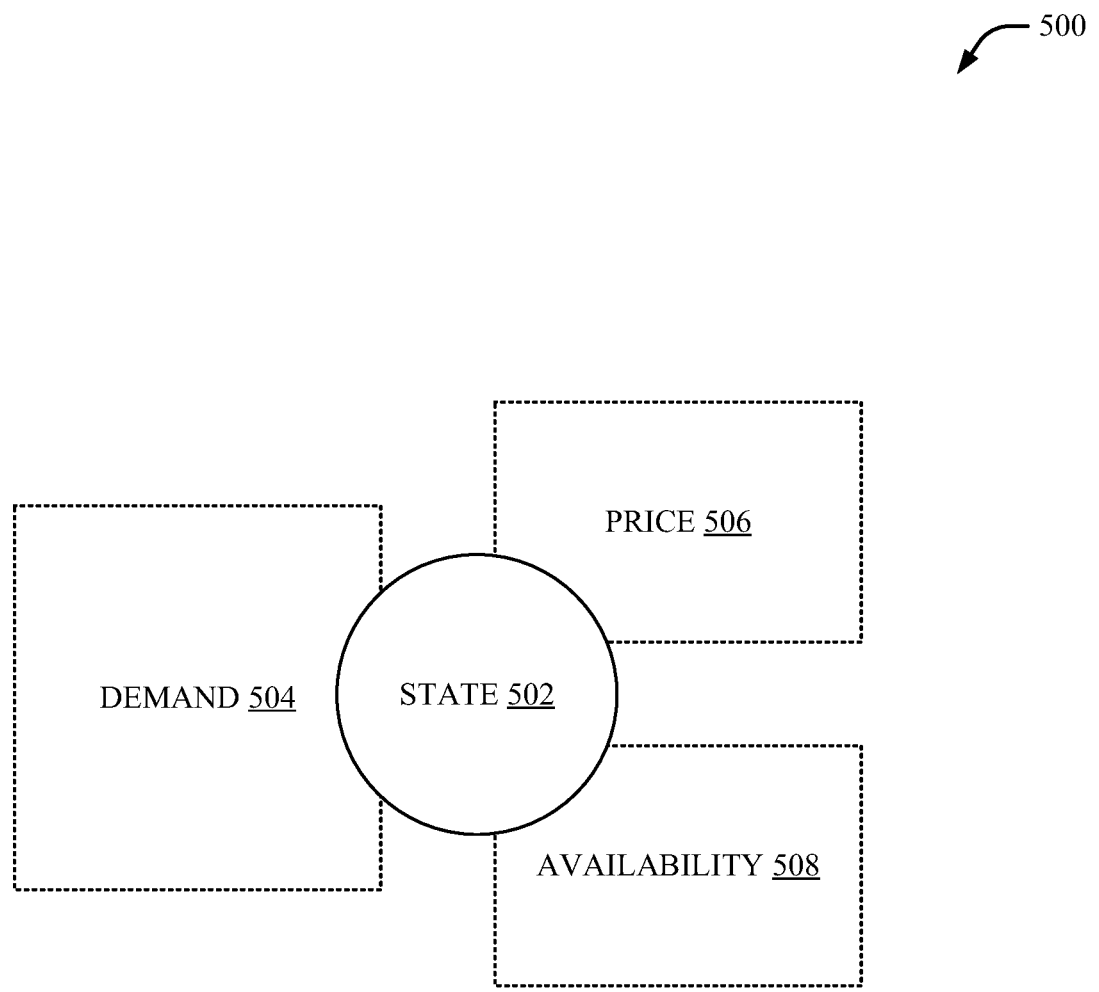
FIG. 5 illustrates a system associated with a state and one or more classifications, in accordance with one or more embodiments described herein.

FIG. 5 illustrates a system 500 in accordance with one or more embodiments of the disclosure. The system 500 includes a state 502 and one or more classifications for the state 502. The state 502 is, for example, a state of a state machine (e.g., the state machine 402). In an embodiment, the one or more classifications for the state 502 include demand 504, price 506 and/or availability 508. For instance, in an embodiment, the demand 504 provides a demand classification to facilitate determining when and/or how many assets should be ordered to meet a particular demand. A classification for the demand 504 is determined from a set of demand classifications. For example, in an embodiment, an asset is classified as a fast-moving asset with low inventory control and high ordering, an intermittent asset with non-variable demand orders, a dynamic demand with variable ordering and frequent occurrence, a dynamic demand with a high difference in ordering period, etc. The price 506 provides a price classification to facilitate determining, for example, whether to order the asset in bulk or to order the asset to meet demand. In an embodiment, a classification for the price 506 is determined from a set of price classifications. For example, in an embodiment, an asset is classified as high price with respect to a price line, medium price with respect to a price line, low price with respect to a price line, etc. The availability 508 provides an availability classification to facilitate determining, for example, an optimal time period to order the asset. In an embodiment, a classification for the availability 508 is determined from a set of availability classifications. For example, in an embodiment, an asset is classified as high availability with respect to a time period, medium availability with respect to a time period, low availability with respect to a time period, etc.

In an embodiment, the demand 504 is associated with a first axis of a 3-axis part segmentation system, the price 506 is associated with a second axis of the 3-axis part segmentation system, and the availability 508 is associated with a third axis of the 3-axis part segmentation system. The demand 504 is employed, for example, to determine when and how many assets should be ordered to support demand based on demand movement patterns. In an aspect, the demand 504 is segmented based on different possible demand movement conditions such as, for example, fast-moving, slow-moving, erratic, stagnant, dynamic, etc. The demand movement conditions are based on movement criteria and/or historical movement conditions. In certain embodiments, the price 506 evaluates whether ordering at a certain quantity level is more optimal. In an aspect, the price 506 is segmented into three groups (e.g., low, medium, and high) with pivot points corresponding to the groups being selected based on a normalized scale. In certain embodiments, the availability 508 analyzes lead-times for assets to optimize order timing of assets and/or to reduce risk of a stock-out situation for assets. In an aspect, the availability 508 is segmented into groups based on lead-time measured in an interval of time (e.g., days, months, etc.). The groups are associated with certain boundary values (e.g., 0-14 days) for a short lead-time group and certain boundary values (e.g., 15-180 days) for a long lead-time group. Each asset is assigned to a certain group for the demand 504, the price 506 and/or the availability 508. For example, forty-five different permutations for the state 502 can be possible with a 3-axis part segmentation system.

In another embodiment, the state 502 is represented as a point cloud formation of segmentation states. For example, in an embodiment, a point cloud value corresponds to an x, y, z coordinate value where an x-coordinate value corresponds to the demand 504 for the state 502, a y-coordinate value corresponds to the price 506 for the state 502, and/or a z-coordinate value corresponds to the z-coordinate value.

In certain embodiments, point cloud values for respective assets are employed to generate a forecast model. For instance, in an embodiment, a forecast model is represented as a point cloud formation that comprises a set of data points associated with states of assets. In certain embodiments, the forecasting component 108 employs the point cloud formation to predict a change in demand data for the one or more assets during a future interval of time. In an aspect, the machine learning component 106 determines one or more behavior changes associated with one or more assets based on the point cloud formation.

Figure 6:
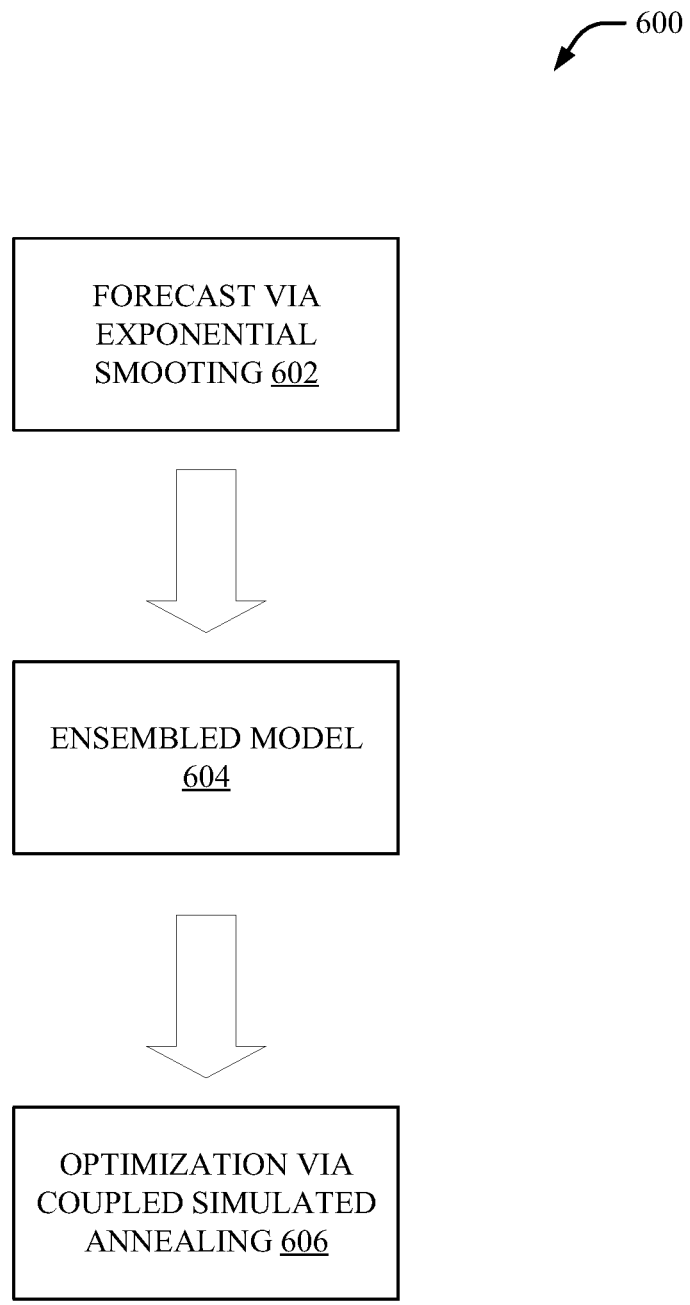
FIG. 6 illustrates another system that facilitates forecasting related to one or more assets, in accordance with one or more embodiments described herein.

FIG. 6 illustrates a system 600 in accordance with one or more embodiments of the disclosure. The system 600 illustrates piece-wise forecasting that includes a forecast via exponential smoothing 602, an ensembled model 604, and optimization via coupled simulated annealing 606. For instance, the forecast via exponential smoothing 602 includes a first forecast for an asset based on first historical asset data for the asset that is associated with a first time period, a second forecast for the asset based on second historical asset data for the asset that is associated with a second time period, and a third forecast for the asset based on third historical asset data for the asset that is associated with a third time period. Furthermore, in certain embodiments, the first forecast, the second forecast and/or the third forecast for the asset undergoes an exponential smoothing process that smooths (e.g., applies a set of weights with exponentially decreasing weight values) to time series data of the respective forecasts. The ensembled model 604 is, for example, a combination of the first forecast, the second forecast, and the third forecast for the asset. In certain embodiments, a first confidence factor is applied to the first forecast, a second confidence factor is applied to the second forecast, and a third confidence factor is applied to the third forecast. Furthermore, the ensembled model 604 corresponds to a combination of the first forecast, the second forecast, and the third forecast with the respective confidence factors. The coupled simulated annealing 606 provides optimization of the ensembled model 604, in certain embodiments. For example, in certain embodiments, the coupled simulated annealing 606 optimizes the ensembled model 604 to determine a global optima associated with an optimized forecast for the asset.

Figure 7:
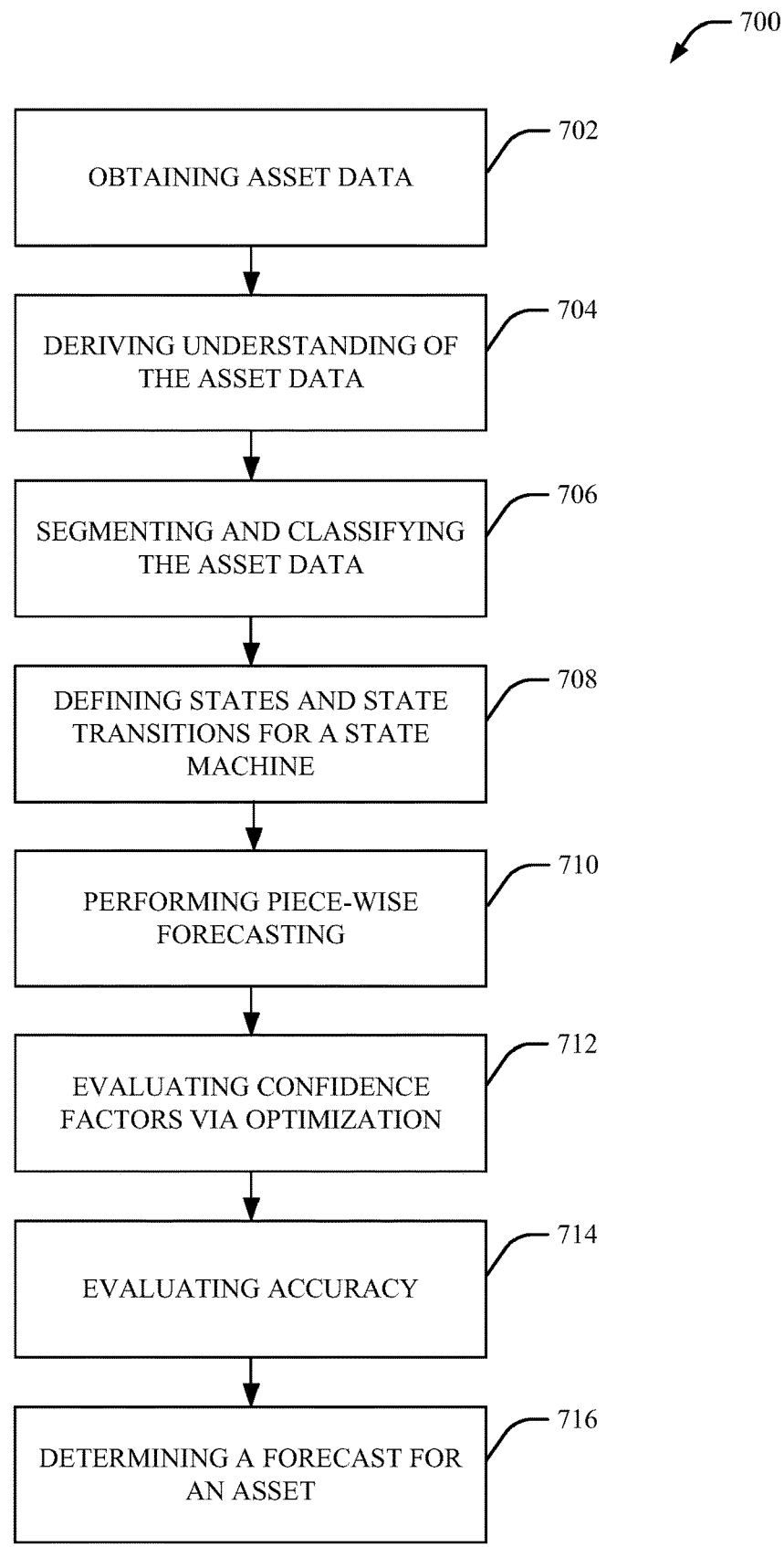
FIG. 7 illustrates a flow diagram for facilitating forecasting with state transitions and confidence factors, in accordance with one or more embodiments described herein.

FIG. 7 illustrates a computer-implemented method 700 for facilitating forecasting with state transitions and confidence factors in accordance with one or more embodiments described herein. In an embodiment, the computer-implemented method 700 is associated with the asset forecasting system 102. In one or more embodiments, the computer-implemented method 700 begins with obtaining asset data (block 702). An example of the obtained asset data is represented by Table 1 below:

TABLE 1

Obtained Asset Data

| Field | Value |
| --- | --- |
| Domains | 3 (Electrical, Mechanical, Components) |
| Demand Streams | 8 |
| Statistically Forecasted Demand Streams | 3 |
| Adjusted Demand Streams | 3 |
| Other Demand Streams | 2 |
| Total number of Records | 19,248 (Electrical + 17,831 (Mechanical) + 290,163 (Components) |
| Date Range | 2014-2017 |
| Time Unit Analyzed | Month |

TABLE 1-continued

Obtained Asset Data

| Field | Value |
| --- | --- |
| Training Data Date Range | March 2014-December 2016 |
| Test Data Date Range | January 2017-May 2017 |
| Numeric Variables Used | 4 |
| Date Variables Used | 1 |
| Text Variables Used | 6 |

The computer-implemented method 700 also includes deriving understanding of the asset data (block 704). For example, in an embodiment, an initial understand of the asset data is derived from the obtained asset data. In another embodiment, descriptive analytics is performed on one or more assets listed in Table 1 to obtain information related to lead times, prices, safety stocks, etc. across several demand streams (e.g., individual ordering entities) of an electrical domain, a mechanical domain, and/or a components domain. After performing the understanding of asset data, the following information may be obtained, as shown in Table 2 below:

TABLE 2

Asset Behavior

| Field | Electrical | Mechanical | Components |
| --- | --- | --- | --- |
| Number of Parts | 559 | 402 | 10,900 |
| Number of records | 19,428 | 17,831 | 290,613 |
| Number of Demand streams | 5 | 5 | 8 |
| Lead Time (Highest) | 994 | 999 | 999 |
| Lead Time (Lowest) | 1 | 1 | 0 |
| Average Lead Time (days) | 116 | 111.8 | 103.5 |
| Safety Stock (Highest) | 727.1 | 486.6 | 4416 |
| Safety Stock (Lowest) | 0 | 0 | 0 |
| Price (Highest) | $235,927 | $373,723 | $591,027 |
| Average Price (Unique Part IDs) | $2,477 | $3,680 | $798 |
| Highest Order Quantity | 2777 | 560 | 22137 |
| Lowest Order Quantity | 0 | 0 | 0 |
| Average Order Quantity (Unique Part IDs) | 9.7 | 3.8 | 7 |
| Overall Price Factor (Based on number of records) | 16.65% | 15.90% | 67.45% |

In an embodiment, as a result of understanding the obtained asset data, behavior associated with one or more assets is determined. For example, in certain embodiments, one or more assets are associated with a steady ordering history (e.g., flat trend), and one or more other assets are associated with a random ordering trend associated with demand increases. As such, one or more assets within a same demand stream can exhibit different ordering patterns. Orders for assets can additionally exhibit seasonal behavior and/or randomness behavior. Therefore, a model for an asset includes a seasonal effect with a certain degree of randomness, in certain embodiments.

Furthermore, the computer-implemented method 700 includes segmenting and classifying the asset data (block 706). In an embodiment, the asset data is segmented based on a 3-axis part segmentation system where each asset is tagged to a certain condition within the axis. The three-axis segmentation system includes, for example, a first axis associated with a first attribute, a second axis associated with a second attribute, and a third axis associated with a second attribute. In one example, the three-axis segmentation system is a first axis associated with demand, a second axis associated with price, and a third axis associated with availability. In an aspect, the-axis part segmentation system employs a set of pivot values for the first axis, the second axis and/or the third axis. For example, in an embodiment, distribution of assets across states of the state machine is a derivate of the pivot values for the first axis, the second axis and/or the third axis. In certain embodiments, the set of pivot values are determined based on attributes of the asset data 114. For example, in an embodiment, the set of pivot values are determined based on price and/or lead time for the one or more assets.

The computer-implemented method 700 also includes defining states and state transitions for a state machine (block 708). In certain embodiments, to define states and state transitions, a Markov chain model is employed to capture behavior of the one or more assets. A state is defined as a three-dimensional representation of an asset where each dimension is derived from a category in each axis in the format of demand, price, and availability, for example. In an aspect, assets are assigned states and/or state transitions based on historical asset data and/or predictive asset data using the Markov chain model.

The computer-implemented method 700 also includes performing piece-wise forecasting (block 710). For example, different forecasts associated with different time periods are generated and/or combined to provide an ensembled model for the asset data. In certain embodiments, the different forecasts are generated based on exponential smoothing of respective asset data. For example, in certain embodiments, exponential smoothing are employed to generate individual forecasts and/or piece-wise forecasts. In an aspect, formulation of a sequential forecast model associated with the piece-wise forecasting is based on the segmenting of the asset data, the classifying of the asset data, and/or the states and state transitions for the state machine. Additionally, features of a sequential forecast model associated with the piece-wise forecasting is based on the understanding of the asset data. Segmenting parts based on categories allow portions of a forecast for an asset to adopt values from similar assets in a scenario where available data history is sparse. Also, aggregation of similar asset categories allow a sequential forecast model to harmonize order quantities by smoothing using effects of pooling. Furthermore, forecasting based on values after smoothing provides increased stability for a sequential forecast model.

Furthermore, the computer-implemented method 700 includes evaluating confidence factors via optimization (block 712). For example, one or more confidence factors are applied to the different forecasts to account for possible cycle nature of different time periods. In an embodiment, confidence factors include equal weights in response to a determination that states of the forecasts are similar. In another embodiment, confidence factors include one or more different weights in response to a determination that one or more states of the forecasts are different. For example, in certain embodiments, confidence factors include selective equal weights based on one or more similar states for the forecasts. In another example, confidence factors include unequal weights based on dissimilar states for the forecasts.

In certain embodiments, similar states of forecasts across different periods of time result in similar confidence factors.

The computer-implemented method 700 also includes evaluating accuracy (block 714). For instance, in an embodiment, accuracy of the forecasts is evaluated. In an embodiment, accuracy of values and/or parameters of the forecasts are evaluated based on a MAPE technique. Additionally or alternatively, safety stock of assets associated with the forecasts and/or inventory of assets (e.g., days of sales inventory of assets) associated with forecasts is evaluated. In certain embodiments, one or more evolutionary optimization techniques and/or a simulated annealing technique are employed to provide more accurate results. In one example, an objective of the optimization may be to minimize capital tied up in holding inventory for assets while ensuring no stock-out scenarios and lower error. In certain embodiments, a MAPE technique is employed to provide, for example, optimal balance between planning and inventory with a focus on minimizing tied-up capital. In an aspect, one or more confidence factors adjust a forecast so that an ensemble forecast provides an improved estimate. Based on the confidence factors, a forecast is computed for a future time period of interest. In certain embodiments, a feedback loop is employed to automatically correct for prediction errors when new data is available. One or more confidence factors are also updated based on the feedback loop. As a result, in one or more embodiments, continuous and/or periodic update of a current state of assets and demand of assets is provided. Moreover, a dynamic, state defined representation of forecasts with increased accuracy is provided. In an embodiment, the MAPE technique determines whether one or more assets exceed a MAPE threshold value based on evaluation of a forecast. For example, the MAPE technique determines whether one or more assets exceed a MAPE threshold value for the electrical domain and/or the mechanical domain. In an aspect, a confidence factor for the asset is modified based on a determination as to whether one or more assets exceed the MAPE threshold value. In another embodiment, accuracy of values and/or parameters of the forecasts is determined based on a measure of deviation (e.g., a mean absolute deviation) between forecasts.

In certain embodiments, a forecast is adjusted based on an evaluated accuracy of the forecast. For example, in certain embodiments, information regarding an asset is modified (e.g., a part number for an asset is modified, a part is changed or replaced, etc.). Additionally or alternatively, further segmentation of assets is performed based on design, material and/or reliability indices for an asset. Additionally or alternatively, in certain embodiments, a forecast is designated for a different purpose. For example, in certain embodiments, a forecast is designated for an isolated event and/or exceptional events. Additionally or alternatively, in certain embodiments, a forecast is modified based on consumer behavior (e.g., ordering patterns of consumers, etc.). Additionally or alternatively, in certain embodiments, a forecast is modified based on sales history, inventory history and/or operation planning analysis related to assets.

Furthermore, the computer-implemented method 700 includes determining a forecast for an asset (block 716). In an embodiment, to provide improved computational efficiency and/or accuracy, a forecast is provided at a category level. A category level is, for example, a category that describes one or more characteristics of an asset. For example, in an embodiment, a category level is an asset movement category. In another embodiment, a forecast is provided at an asset domain level related to the electrical domain, the mechanical domain or the component domain. In yet another embodiment, a forecast is provided at an asset level applicable to a particular asset. In yet another embodiment, a forecast is provided at a demand stream level associated with a particular demand stream and/or demand characteristics. In yet another embodiment, a forecast is provided at a global level associated with two or more assets, two or more demand streams, two or more categories, and/or two or more asset domains.

Figure 8:
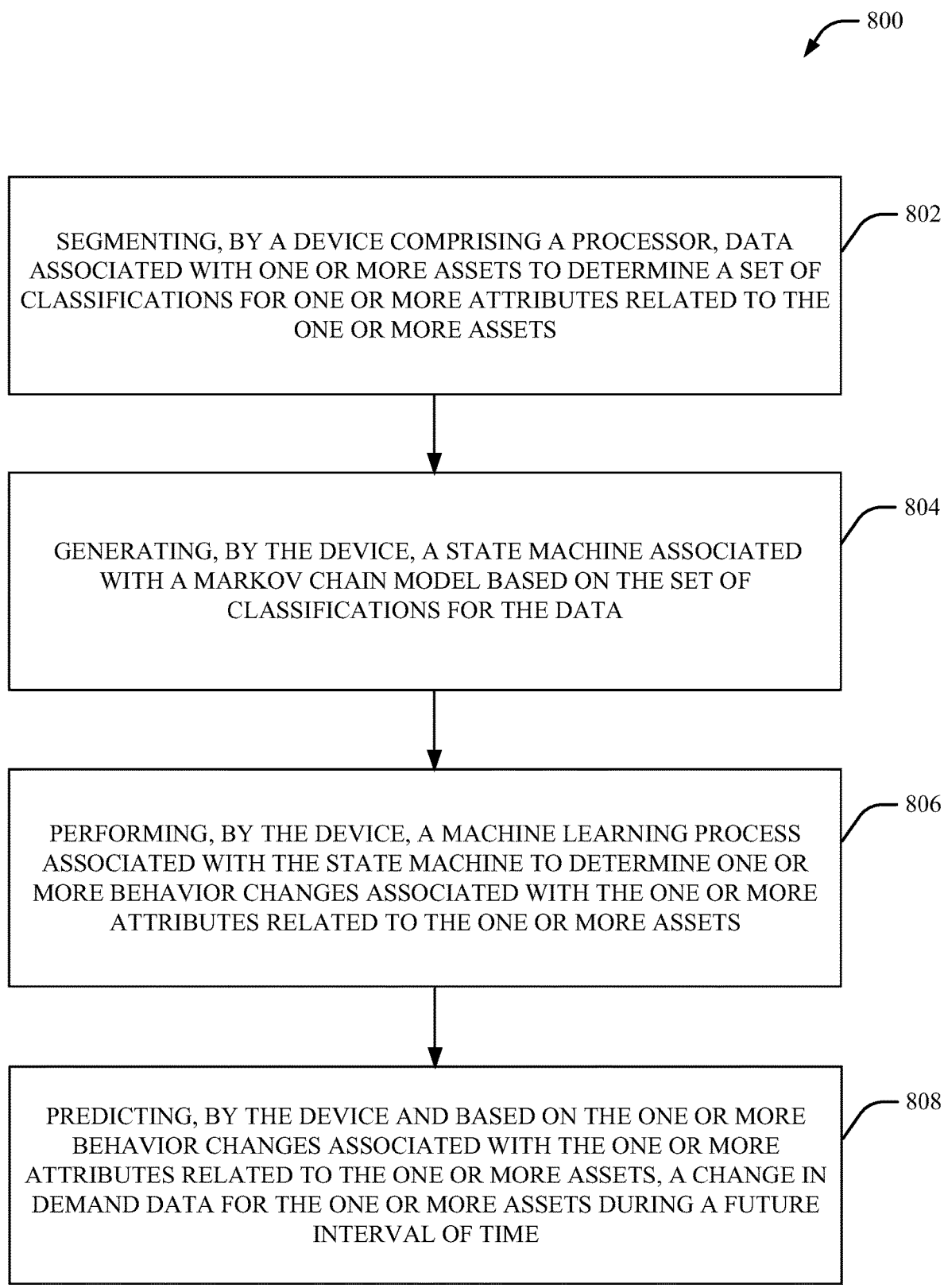
FIG. 8 illustrates a flow diagram for facilitating forecasting with state transitions and confidence factors, in accordance with one or more embodiments described herein.

FIG. 8 illustrates a computer-implemented method 800 for facilitating forecasting with state transitions and confidence factors in accordance with one or more embodiments described herein. In an embodiment, the computer-implemented method 800 is associated with the asset forecasting system 102. In one or more embodiments, the computer-implemented method 800 begins with segmenting, by a device comprising a processor (e.g., by the asset attribute component 104), data associated with one or more assets to determine a set of classifications for one or more attributes related to the one or more assets (block 802). In an embodiment, the data associated with the one or more assets describes one or more attributes for the one or more assets. For example, the data associated with the one or more assets can include records data, part number data, price data, sales data, quantity data, order quantity data, safety stock data, state data, sales price data, historical price change data, demand data, lead time data, location data, customer data, seasonality data, sensor data, voltage level data, current level data, temperature data, and/or other data related to the one or more assets. The one or more assets is one or more mechanical components, one or more electrical components, one or more parts, one or more machines, one or more equipment, one or more tools, one or more instruments, one or more sensors, and/or one or more other types of assets. In an embodiment, the data is segmented based on identified attributes in the data.

The computer-implemented method 800 also includes generating, by the device (e.g., by the asset attribute component 104), a state machine associated with a Markov chain model based on the set of classifications for the data (block 804). The state machine includes a set of states associated with the one or more classifications. For example, respective states of the state machine are correlated to respective classifications from the set of classifications. In an embodiment, states and/or state transitions are defined in the Markov chain model based on the one or more classifications for the data associated with one or more assets. The Markov chain model is, for example, a stochastic model that includes a sequence of states that is traversed based on a probability determined from one or more previous states in the Markov chain model. For example, in certain embodiments, a probability distribution associated with the one or more classifications is employed to traverse states of the Markov chain model. In certain embodiments, a state of the state machine is associated with two or more classifications. For instance, in certain embodiments, a state of the state machine is configured with two or more classifications. In one example, a state of the state machine is configured with a first classification related to demand for the one or more assets, a second classification related to price for the one or more assets, and a third classification related to availability for the one or more assets. In one embodiment, a state of the state machine (e.g., a state of the Markov chain model) is a three-dimensional representation of an asset where each dimension is derived from one or more classification categories in each axis is associated with a respective attribute. In one example, the one or more classification categories includes demand, price, and/or availability.

Furthermore, the computer-implemented method 800 includes performing, by the device (e.g., by the machine learning component 106), a machine learning process associated with the state machine to determine one or more behavior changes associated with the one or more attributes related to the one or more assets (block 806). In an aspect, the one or more behavior changes correspond to one or more inflection points in the data associated with the one or more assets. For example, in an embodiment, the one or more behavior changes correspond to one or more patterns of change in the data associated with the one or more assets. In another aspect, the one or more behavior changes correspond to state changes within the state machine. For instance, in an embodiment, the one or more behavior changes are determined based on one or more state transitions of the state machine. In certain embodiments, the machine learning process employs principles of iteration, self-adjustment, and/or self-learning associated with principles of machine learning and/or artificial intelligence.

The computer-implemented method 800 also includes predicting, by the device (e.g., by the forecasting component 108) and based on the one or more behavior changes associated with the one or more attributes related to the one or more assets, a change in demand data for the one or more assets during a future interval of time (block 808). In an embodiment, a forecast model is determined to facilitate prediction of the change in the demand data for the one or more assets during the future interval of time. For example, in an embodiment, the forecast model predicts a certain state from the set of state of the state machine for an asset during the future interval of time based on the one or more behavior changes associated with the one or more attributes related to the one or more assets. In another embodiment, a state from the state machine for an asset during the future interval of time is predicted based on the one or more behavior changes associated with the one or more attributes related to the one or more assets. In certain embodiments, an ensembled forecast combines two or more forecasts for the data associated with the one or more assets. For example, in an embodiment, the ensembled model comprises a combination of at least a first forecast model related to a first prediction for the change in the demand data, and a second forecast model related to a second prediction for the change in the demand data. In certain embodiments, a first confidence factor is applied to the first forecast model and a second confidence factor is applied to the second forecast model based on similarity of states of the first forecast model and the second forecast model. In certain embodiments, forecast data related to the predicted change in the demand data is transmitted to a computing device to facilitate rendering of the forecast data via an electronic interface of the computing device.

In some example embodiments, certain ones of the operations herein may be modified or further amplified as described below. Moreover, in some embodiments additional optional operations may also be included. It should be appreciated that each of the modifications, optional additions or amplifications described herein may be included with the operations herein either alone or in combination with any others among the features described herein.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The hardware used to implement the various illustrative logics, logical blocks, modules, and circuits described in connection with the aspects disclosed herein may include a general purpose processor, a digital signal processor (DSP), a special-purpose processor such as an application specific integrated circuit (ASIC) or a field programmable gate array (FPGA), a programmable logic device, discrete gate or transistor logic, discrete hardware components, or any combination thereof designed to perform the functions described herein. A general-purpose processor may be a microprocessor, but, in the alternative, the processor may be any processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, or in addition, some steps or methods may be performed by circuitry that is specific to a given function.

In one or more example embodiments, the functions described herein may be implemented by special-purpose hardware or a combination of hardware programmed by firmware or other software. In implementations relying on firmware or other software, the functions may be performed as a result of execution of one or more instructions stored on one or more non-transitory computer-readable media and/or one or more non-transitory processor-readable media. These instructions may be embodied by one or more processor-executable software modules that reside on the one or more non-transitory computer-readable or processor-readable storage media. Non-transitory computer-readable or processor-readable storage media may in this regard comprise any storage media that may be accessed by a computer or a processor. By way of example but not limitation, such non-transitory computer-readable or processor-readable media may include random access memory (RAM), read-only memory (ROM), electrically erasable programmable read-only memory (EEPROM), FLASH memory, disk storage, magnetic storage devices, or the like. Disk storage, as used herein, includes compact disc (CD), laser disc, optical disc, digital versatile disc (DVD), floppy disk, and Blu-Ray Disc™, or other storage devices that store data magnetically or optically with lasers. Combinations of the above types of media are also included within the scope of the terms non-transitory computer-readable and processor-readable media. Additionally, any combination of instructions stored on the one or more non-transitory processor-readable or computer-readable media may be referred to herein as a computer program product.

Many modifications and other embodiments of the inventions set forth herein will come to mind to one skilled in the art to which these inventions pertain having the benefit of teachings presented in the foregoing descriptions and the associated drawings. Although the figures only show certain components of the apparatus and systems described herein, it is understood that various other components may be used in conjunction with the supply management system. Therefore, it is to be understood that the inventions are not to be limited to the specific embodiments disclosed and that modifications and other embodiments are intended to be included within the scope of the appended claims. Moreover, the steps in the method described above may not necessarily occur in the order depicted in the accompanying diagrams, and in some cases one or more of the steps depicted may occur substantially simultaneously, or additional steps may be involved. Although specific terms are employed herein, they are used in a generic and descriptive sense only and not for purposes of limitation.

What is claimed is:

1. A system, comprising:
a processor; and
a memory that stores executable instructions that, when executed by the processor, cause the processor to:
segment data associated with one or more assets to determine a set of classifications for one or more attributes related to the one or more assets;
generate a state machine associated with a stochastic model based on the set of classifications for the data;
perform a machine learning process associated with the state machine to determine one or more behavior changes associated with the one or more attributes related to the one or more assets;
predict, based on the one or more behavior changes associated with the one or more attributes related to the one or more assets, a change in demand data for the one or more assets during a future interval of time; and
configure a state of the state machine with a first classification related to demand for the one or more assets, a second classification related to value for the one or more assets, and a third classification related to availability for the one or more assets.

2. The system of claim 1, wherein the executable instructions further cause the processor to:
correlate respective states of the state machine to respective classifications from the set of classifications.

3. The system of claim 1, wherein the executable instructions further cause the processor to:
configure a state of the state machine with two or more classifications.

4. The system of claim 1, wherein the executable instructions further cause the processor to:
determine the one or more behavior changes based on one or more state transitions of the state machine.

5. The system of claim 1, wherein the executable instructions further cause the processor to:
predict a state from the state machine for an asset during the future interval of time based on the one or more behavior changes associated with the one or more attributes related to the one or more assets.

6. The system of claim 1, wherein the executable instructions further cause the processor to:
transmit, to a computing device, forecast data related to the predicted change in the demand data to facilitate rendering of the forecast data via an electronic interface of the computing device.

7. The system of claim 1, wherein the executable instructions further cause the processor to:
generate an ensembled model that comprises a combination of at least a first forecast model related to a first prediction for the change in the demand data, and a second forecast model related to a second prediction for the change in the demand data.

8. The system of claim 7, wherein the executable instructions further cause the processor to:
apply a first confidence factor to the first forecast model and a second confidence factor to the second forecast model based on similarity of states of the first forecast model and the second forecast model.

9. A computer-implemented method, comprising:
segmenting, by a device comprising a processor, data associated with one or more assets to determine a set of classifications for one or more attributes related to the one or more assets;
generating, by the device, a state machine associated with a stochastic model based on the set of classifications for the data;
performing, by the device, a machine learning process associated with the state machine to determine one or more behavior changes associated with the one or more attributes related to the one or more assets;
predicting, by the device and based on the one or more behavior changes associated with the one or more attributes related to the one or more assets, a change in demand data for the one or more assets during a future interval of time; and
configuring, by the device, a state of the state machine with a first classification related to demand for the one or more assets, a second classification related to value for the one or more assets, and a third classification related to availability for the one or more assets.

10. The computer-implemented method of claim 9, further comprising:
correlating, by the device, respective states of the state machine to respective classifications from the set of classifications.

11. The computer-implemented method of claim 9, further comprising:
configuring, by the device, a state of the state machine with two or more classifications.

12. The computer-implemented method of claim 9, further comprising:
determining, by the device, the one or more behavior changes based on one or more state transitions of the state machine.

13. The computer-implemented method of claim 9, further comprising:
predicting, by the device, a state from the state machine for an asset during the future interval of time based on the one or more behavior changes associated with the one or more attributes related to the one or more assets.

14. The computer-implemented method of claim 9, further comprising:
generating, by the device, an ensembled model that comprises a combination of at least a first forecast model related to a first prediction for the change in the demand data, and a second forecast model related to a second prediction for the change in the demand data.

15. The computer-implemented method of claim 14, further comprising:
applying, by the device, a confidence factor to the first forecast model based on similarity of states of the first forecast model and the second forecast model.

16. A non-transitory computer-readable medium comprising at least one computer-readable storage medium having program instructions embodied thereon, the program instructions executable by a processor to cause the processor to:
segment data associated with one or more assets to determine a set of classifications for one or more attributes related to the one or more assets;
generate a state machine associated with a stochastic model based on the set of classifications for the data;

perform a machine learning process associated with the state machine to determine one or more behavior changes associated with the one or more attributes related to the one or more assets;

predict, based on the one or more behavior changes associated with the one or more attributes related to the one or more assets, a change in demand data for the one or more assets during a future interval of time; and configure a state of the state machine with a first classification related to demand for the one or more assets, a second classification related to value for the one or more assets, and a third classification related to availability for the one or more assets.

17. The non-transitory computer-readable medium of claim 16, wherein the program instructions are executable by the processor to cause the processor to:

correlate respective states of the state machine to respective classifications from the set of classifications.

18. The non-transitory computer-readable medium of claim 16, wherein the program instructions are executable by the processor to cause the processor to:

configure a state of the state machine with two or more classifications.

19. The non-transitory computer-readable medium of claim 16, wherein the program instructions are executable by the processor to cause the processor to:

determine the one or more behavior changes based on one or more state transitions of the state machine.

20. The computer-implemented method of claim 9, further comprising:

transmitting, to a computing device, forecast data related to the predicted change in the demand data to facilitate rendering of the forecast data via an electronic interface of the computing device.

* * * * *